United States Patent
Oki et al.

(10) Patent No.: US 9,755,510 B2
(45) Date of Patent: Sep. 5, 2017

(54) SWITCHING POWER SUPPLY

(71) Applicant: Rohm Co., Ltd., Kyoto (JP)

(72) Inventors: Hirokazu Oki, Kyoto (JP); Kiyoaki Hoshino, Kyoto (JP); Seiichiro Kondo, Kyoto (JP); Yuichi Kokusho, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 14/924,803

(22) Filed: Oct. 28, 2015

(65) Prior Publication Data

US 2016/0126842 A1    May 5, 2016

(30) Foreign Application Priority Data

Nov. 4, 2014  (JP) ................. 2014-224470

(51) Int. Cl.
   *H02M 3/156*   (2006.01)
   *H02M 3/157*   (2006.01)
   *H02M 1/00*    (2006.01)

(52) U.S. Cl.
   CPC ............ *H02M 3/156* (2013.01); *H02M 3/157* (2013.01); *H02M 2001/0025* (2013.01)

(58) Field of Classification Search
   CPC ..... G05F 1/56; G05F 1/59; G05F 1/62; G05F 1/573; G05F 1/575; H02M 3/1584; H02M 3/1588; H02J 1/102; Y02B 70/1466
   USPC .......................... 323/234, 271, 282–285, 299
   See application file for complete search history.

(56) References Cited

U.S. PATENT DOCUMENTS

| | | | |
|---|---|---|---|
| 2012/0038341 A1* | 2/2012 | Michishita ............ | H02M 3/158 323/284 |
| 2015/0137776 A1* | 5/2015 | Thomas .............. | H02M 3/1588 323/271 |

FOREIGN PATENT DOCUMENTS

JP         2006-304406        11/2006

* cited by examiner

*Primary Examiner* — Yemane Mehari
(74) *Attorney, Agent, or Firm* — Fish & Richardson P.C.

(57) ABSTRACT

A switching power supply includes: a switching output circuit generating an output voltage from an input voltage according to ON/OFF control of an output transistor by a pulse width modulation (PWM) signal; a first voltage generating circuit generating a first voltage based on a difference between the output voltage and a predetermined reference voltage; a second voltage generating circuit generating a triangular second voltage; a comparing circuit generating a comparison signal by comparing the first voltage and the second voltage; a clock oscillating circuit generating a clock signal; and a logic circuit generating a PWM signal in response to the clock signal and the comparison signal, wherein the second voltage generating circuit generates the second voltage by adding a first slope voltage having a first slope and a second slope voltage having a second slope according to current flown through the switching output circuit.

11 Claims, 10 Drawing Sheets

SWITCHING POWER SUPPLY

CROSS-REFERENCE TO RELATED APPLICATION

This application is based upon and claims the benefit of priority from Japanese Patent Application No. 2014-224470, filed on Nov. 4, 2014, the entire contents of which are incorporated herein by reference.

TECHNICAL FIELD

The present disclosure relates to a switching power supply.

BACKGROUND

A switching power supply of a PWM (Pulse Width Modulation) driving type generally includes, as circuit elements forming a voltage feedback loop, an error amplifier for generating an error signal corresponding to a difference between an output voltage or a corresponding feedback voltage and a predetermined reference voltage, a slope oscillation part for generating a triangular or sawtooth-waved slope voltage, and a comparator for comparing the error voltage and the slope voltage to determine an ON timing of an output transistor.

In many cases, a switching power supply employing a current mode control system having a current feedback loop in addition to the voltage feedback loop is employed for applications requiring high load response characteristics. In the switching power supply of the current mode control system, in general, the voltage feedback loop and the current feedback loop are formed to generate the slope voltage by adding a first slope voltage having a constant slope and a second slope voltage having a slope depending on a load current.

However, in the conventional switching power supply, the slope of the first slope voltage is fixed to a constant value. In addition, the slope of the second slope voltage is set to a multiplication of the load current with a constant current feedback gain.

However, a slope of the first slope voltage and a slope of the second slope voltage (the current feedback gain) providing the best responsiveness and stability of the switching power supply are varied depending on the usage situations (e.g., an input voltage, an output voltage, a switching frequency, a load current, a temperature and the like) of the switching power supply.

Therefore, it is difficult for the conventional switching power supply to optimize its responsiveness and stability depending on its usage situations.

SUMMARY

The present disclosure provides some embodiments of a switching power supply which is capable of optimizing its responsiveness and stability in order to overcome the above problems found by the present inventors.

According to one embodiment of the present disclosure, there is provided a switching power supply including: a switching output circuit configured to generate an output voltage from an input voltage according to ON/OFF control of an output transistor by a pulse width modulation signal; a first voltage generating circuit configured to generate a first voltage based on a difference between the output voltage or a corresponding feedback voltage and a predetermined reference voltage; a second voltage generating circuit configured to generate a triangular or sawtooth-waved second voltage; a comparing circuit configured to generate a comparison signal by comparing the first voltage and the second voltage; a clock oscillating circuit configured to generate a clock signal having a switching frequency; and a logic circuit configured to generate a pulse width modulation signal in response to the clock signal and the comparison signal, wherein the second voltage generating circuit generates the second voltage by adding a first slope voltage having a first slope and a second slope voltage having a second slope according to an output current flown through the switching output circuit, and at least one of the first slope and the second slope is randomly adjusted depending on a set value (hereinafter referred to as a "first feature").

In some embodiments, the switching power supply according to the first feature may further include a frequency characteristic adjusting circuit configured to provide the set value to the second voltage generating circuit (hereinafter referred to as a "second feature").

In some embodiments, the switching power supply according to the second feature may include the frequency characteristic adjusting circuit including: a register part which stores the set value; and an interface part which rewrites the set value according to an instruction from a control circuit (hereinafter referred to as a "third feature").

In some embodiments, the switching power supply according to any one of the first, second, third features may include the second voltage generating circuit including: a slope oscillating part which generates the first slope voltage; a current detecting part which generates the second slope voltage; and an adding part which generates the second voltage by adding the first slope voltage and the second slope voltage (hereinafter referred to as a "fourth feature").

In some embodiments, the switching power supply according to the fourth feature may include the slope oscillating part including: a first D/A converter which generates a first analog voltage according to a first digital set value, with a fixed voltage as a power supply voltage; a first V/I converter which generates a charging current according to the first analog voltage; a capacitor charged with the charging current; a switch which performs charging/discharging control of the capacitor in synchronization with the clock signal; and a second V/I converter which generates a first slope current according to a charging voltage of the capacitor (hereinafter referred to as a "fifth feature").

In some embodiments, the switching power supply according to the fifth feature may include the current detecting part including: a first I/V converter which generates a variable voltage according to the output current; a second D/A converter which generates a second analog voltage according to a second digital set value, with the variable voltage as a power supply voltage; and a third V/I converter which generates a second slope current according to the second analog voltage (hereinafter referred to as a "sixth feature").

In some embodiments, the switching power supply according to the sixth feature may include the adding part including: a current adder which generates an additional current by adding the first slope current and the second slope current; and a second I/V converter which generates the second voltage according to the additional current (hereinafter referred to as a "seventh feature").

In some embodiments, the switching power supply according to one of the first to seventh features may include the first voltage generating circuit including: an error amplifier which generates an error voltage based on a difference between the output voltage or the feedback voltage and the reference voltage; and a phase compensation filter which generates the first voltage by compensating a phase of the error voltage (hereinafter referred to as an "eighth feature").

According to another embodiment of the present disclosure, there is provided a switching power supply including: a switching output circuit configured to generate an output voltage from an input voltage according to ON/OFF control of an output transistor by a pulse width modulation signal; a first voltage generating circuit configured to generate a first voltage based on a difference between the output voltage or a corresponding feedback voltage and a predetermined reference voltage; and a digital signal processing circuit configured to generate the pulse width modulation signal, wherein the digital signal processing circuit sets a duty cycle (DUTY) of the pulse width modulation signal based on the following formula:

$$DUTY = D1/\{(Kslp \times Sslp + Kcs \times Scs) \times T\},$$

where, D1 denotes a digital value of the first voltage, Sslp denotes a predetermined voltage slope, Scs denotes a current slope varied depending on the output current flown through the switching output circuit, Kslp denotes a voltage slope coefficient, Kcs denotes a current slope coefficient, and T denotes a switching period, and wherein at least one of the voltage slope coefficient and the current slope coefficient is randomly adjusted (hereinafter referred to as a "ninth feature").

In some embodiments, the switching power supply according to the ninth feature may include the first voltage generating circuit implemented by digital processing in the digital signal processing circuit (hereinafter referred to as a "tenth feature").

DETAILED DESCRIPTION

First Embodiment

Figure 1:
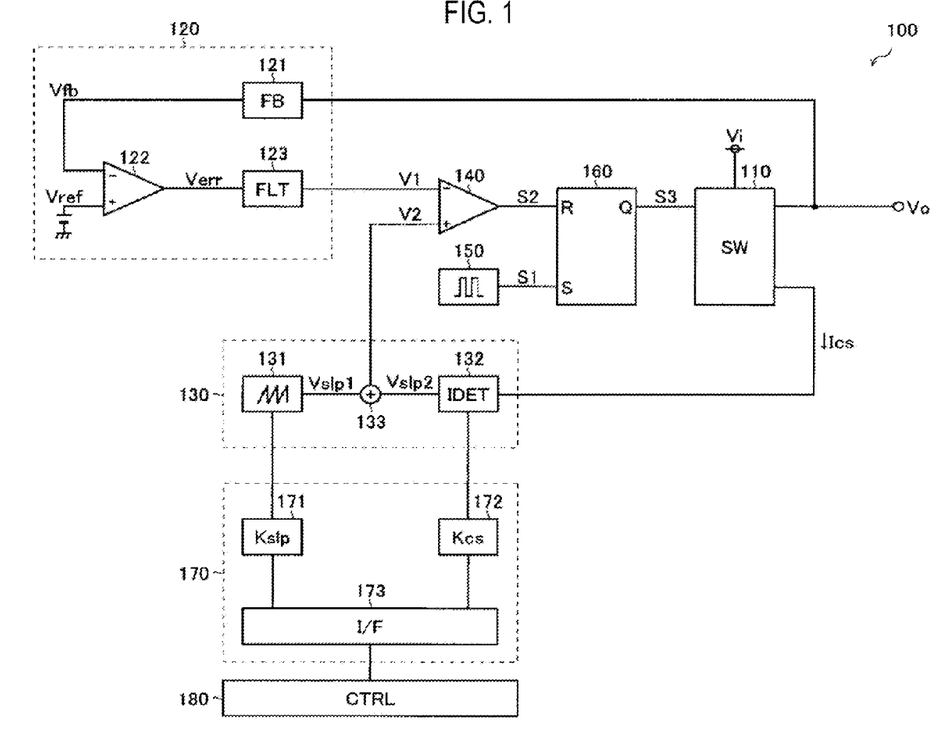
FIG. 1 is a block diagram showing a switching power supply 100 according to a first embodiment.

FIG. 1 is a block diagram showing a switching power supply 100 according to a first embodiment. The switching power supply 100 is a PWM driving type DC/DC converter for generating a desired output voltage Vo from an input voltage Vi which is then supplied to a load, and includes a switching output circuit 110, a first voltage generating circuit 120, a second voltage generating circuit 130, a comparing circuit 140, a clock oscillating circuit 150, a logic circuit 160, a frequency characteristic adjusting circuit 170 and a control circuit 180. The switching power supply 100 may appropriately include other protection circuits (a low input malfunction preventing circuit, a temperature protection circuit and so on) in addition to the above-mentioned circuit elements.

The switching output circuit 110 generates the output voltage Vo from the input voltage Vi in response to ON/OFF control of an output transistor by a pulse width modulation (PWM) signal S3. The switching output circuit 110 may be of any output types including a step-down type, a step-up type, a step-up/down type and an inversion type. In addition, the switching output circuit 110 may employ either a synchronous rectification type or a diode rectification type. In addition, when a high voltage is applied to an output transistor or a synchronous rectifying transistor of the switching output circuit 100, a high-breakdown voltage element such as a power MOSFET (Metal-Oxide-Semiconductor Field Effect Transistor), IGBT (Insulated Gate Bipolar Transistor), SiC transistor or the like may be used as these transistor elements.

The first voltage generating circuit 120 is a circuit block for generating a first voltage V1 based on the difference between the output voltage Vo or a corresponding feedback voltage Vfb and a predetermined reference voltage Vref, and includes a feedback voltage generating part 121, an error amplifier 122 and a phase compensation filter 123.

The feedback voltage generating part 121 generates the feedback voltage Vfb according to the output voltage Vo (for example, a divided voltage of the output voltage Vo). If the output voltage Vo falls within an input dynamic range of the error amplifier 122, the output voltage Vo may be directly input to the error amplifier 122 while omitting the feedback voltage generating part 121.

The error amplifier 122 generates an error voltage Verr based on the difference between the feedback voltage Vfb applied to its inverted input terminal (−) and the reference voltage Vref applied to its non-inverted input terminal (+). The error voltage Verr rises when the feedback voltage Vfb is lower than the reference voltage Vref, and falls when the feedback voltage Vfb is higher than the reference voltage Vref.

The phase compensation filter 123 compensates a phase of the error voltage Verr in order to prevent the error amplifier 122 from being oscillated and generates the first voltage V1. In the example of this figure, the phase compensation filter 123 is disposed on a signal path between the error amplifier 122 and the comparing circuit 140 and it is depicted as if the error voltage Verr and the first voltage V1 are different voltages. However, such depiction is just illustrative. For example, if the phase compensation filter 123 (a series circuit of a resistor and a capacitor, or the like) is connected between an output terminal and a ground terminal of the error amplifier 122, the error voltage Verr is equal to the first voltage V1.

The second voltage generating circuit 130 is a circuit block for generating a triangular or sawtooth-waved second voltage V2 and includes a slope oscillating part 131, a current detecting part 132 and an adding part 133.

The slope oscillating part 131 generates a first slope voltage Vslp1 having a first slope according to a first digital set value Kslp (corresponding to a voltage slope coefficient). That is, the first slope is optionally adjusted according to the first digital set value Kslp. The configuration and operation of the slope oscillating part 131 will be described in more detail later.

The current detecting part 132 receives an output current Ics flowing through the switching output circuit 110 (for example, a switch current flowing through the output transistor, a coil current flowing through a coil, or a load current flowing through the load) and generates a second slope voltage Vslp2 having a second slope which is obtained by multiplying the output current Ics by a second digital set value Kcs (corresponding to a current slope coefficient (current feedback gain)). That is, the second slope is optionally adjusted according to the second digital set value Kcs. The configuration and operation of the current detecting part 132 will be described in more detail later.

The adding part 133 generates the second voltage V2 by adding the first slope voltage Vslp1 and the second slope voltage Vslp2.

The comparing circuit 140 generates a comparison signal S2 by comparing the first voltage V1 applied to its inverted input terminal (−) and the second voltage V2 applied to its non-inverted input terminal (+). The comparison signal S2 has a low level when the second voltage V2 is lower than the first voltage V1, and has a high level when the second voltage V2 is higher than the first voltage V1.

The clock oscillating circuit 150 generates a clock signal S1 which is pulse-driven at a predetermined switching frequency fsw (=1/T).

The logic circuit 160 is an RS flip-flop for generating a PWM signal S3 based on the clock signal S1 input to its set terminal S and the comparison signal S2 input to its reset terminal R. The PWM signal S3 is set to a high level at a rising edge of the clock signal S1 and is reset to a low level at a rising edge of the comparison signal S2.

The frequency characteristic adjusting circuit 170 is a circuit block for providing the first digital set value Kslp and the second digital set value Kcs to the second voltage generating circuit 130 and includes a first register part 171, a second register part 172 and an interface part 173.

The first register part 171 and the second register part 172 stores the first digital set value Kslp and the second digital set value Kcs, respectively. It is depicted in the example of this figure that the slope oscillating part 131 directly reads the first digital set value Kslp from the first register part 171 and the current detecting part 132 directly reads the second digital set value Kcs from the second register part 172. However, such depiction is just illustrative. For example, it may be configured that the interface part 173 reads the first digital set value Kslp and the second digital set value Kcs and transmits them to the slope oscillating part 131 and the current detecting part 132, respectively.

The interface part 173 performs access control to the first register part 171 and the second register part 172 such that the first digital set value Kslp and the second digital set value Kcs are respectively written into the first register part 171 and the second register part 172 according to an instruction from the control circuit 180.

The control circuit 180 adjusts the first digital set value Kslp and the second digital set value Kcs randomly depending on the usage situations (e.g., an input voltage, an output voltage, a switching frequency, a load current, a temperature and the like) of the switching power supply 100. This configuration makes it possible to freely set slopes of the first slope voltage Vslp1 and the second slope voltage Vslp2 (further a slope of the second voltage V2) depending on the usage situations of the switching power supply 100 and optimize the responsiveness and stability of the switching power supply 100. How to adjust the first digital set value Kslp and the second digital set value Kcs will be described in detail later. Although it is depicted in the example of this figure that the control circuit 180 is included as one element of the switching power supply 100, such depiction is just illustrative. For example, the first digital set value Kslp and the second digital set value Kcs may be adjusted by a control circuit 180 (such as a microcomputer or the like) provided in the outside of the switching power supply 100.

Figure 2:
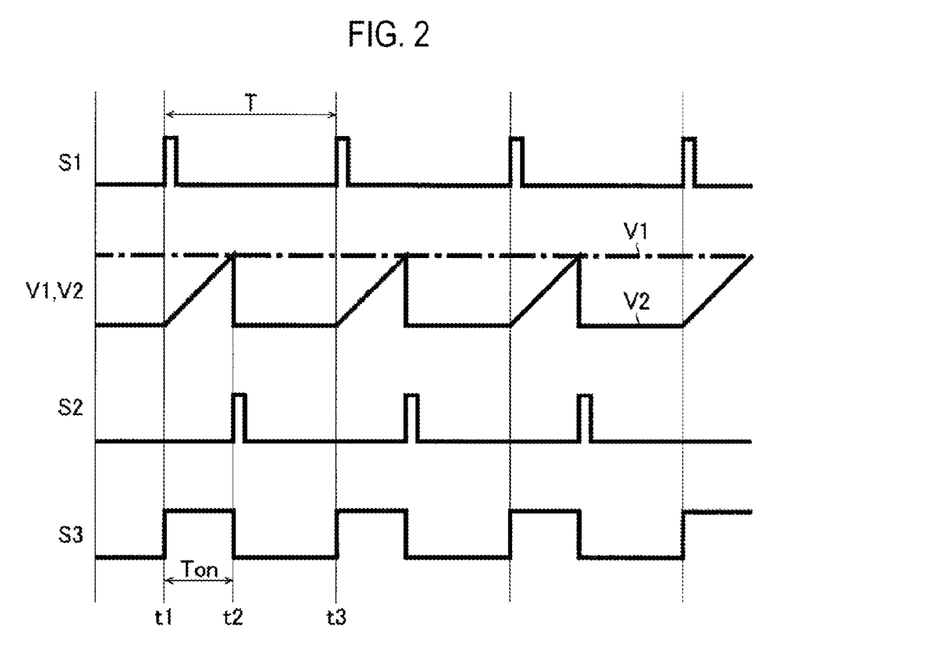
FIG. 2 is a timing chart showing one example of pulse width modulation control.

FIG. 2 is a timing chart showing one example of pulse width modulation control, depicting the clock signal S1, the first voltage V1, the second voltage V2, the comparison signal S2 and the PWM signal S3 in this order from above.

At time t1, when the clock signal S1 rises to a high level, the PWM signal S3 is set to a high level. As a result, the output transistor of the switching output circuit 110 is turned on. In addition, at time t1, when the clock signal S1 rises to the high level, the second voltage V2 begins to rise with a slope according to the first digital set value Kslp and the second digital set value Kcs.

At time t2, when the second voltage V2 is higher than the first voltage V1 and the comparison signal S2 rises to a high level, the PWM signal S3 is reset to a low level. As a result, the output transistor of the switching output circuit 110 is turned off. In addition, at time t2, when the comparison signal S2 rises to the high level, the second voltage V2 is quickly discharged.

According to the above-described pulse width modulation control, a high level period Ton of the PWM signal S3 (i.e., an ON period of the output transistor) become longer with increase in the first voltage V1 and becomes shorter with decrease in the first voltage V1. In other words, a duty cycle DUTY of the PWM signal S3 (i.e., a ratio of the high level period Ton to the switching period T of the clock signal S1) become larger with increase in the first voltage V1 and becomes smaller with decrease in the first voltage V1.

In addition, the switching power supply 100 includes a current feedback loop (the current detecting part 132 and the adding part 133) for monitoring the output current Ic, in addition to a voltage feedback loop for monitoring the voltage Vo. Therefore, it is possible to follow the duty cycle DUTY of the PWM signal S3 without delay with respect to steep load variations, which can result in suppression of variations in the output voltage Vo.

In addition, even after t3 when the clock signal S1 again rises to the high level, as the above-described pulse width modulation control is repeated, the output transistor of the switching output circuit 110 is periodically turned on/off to generate the desired output voltage Vo.

Figure 3:
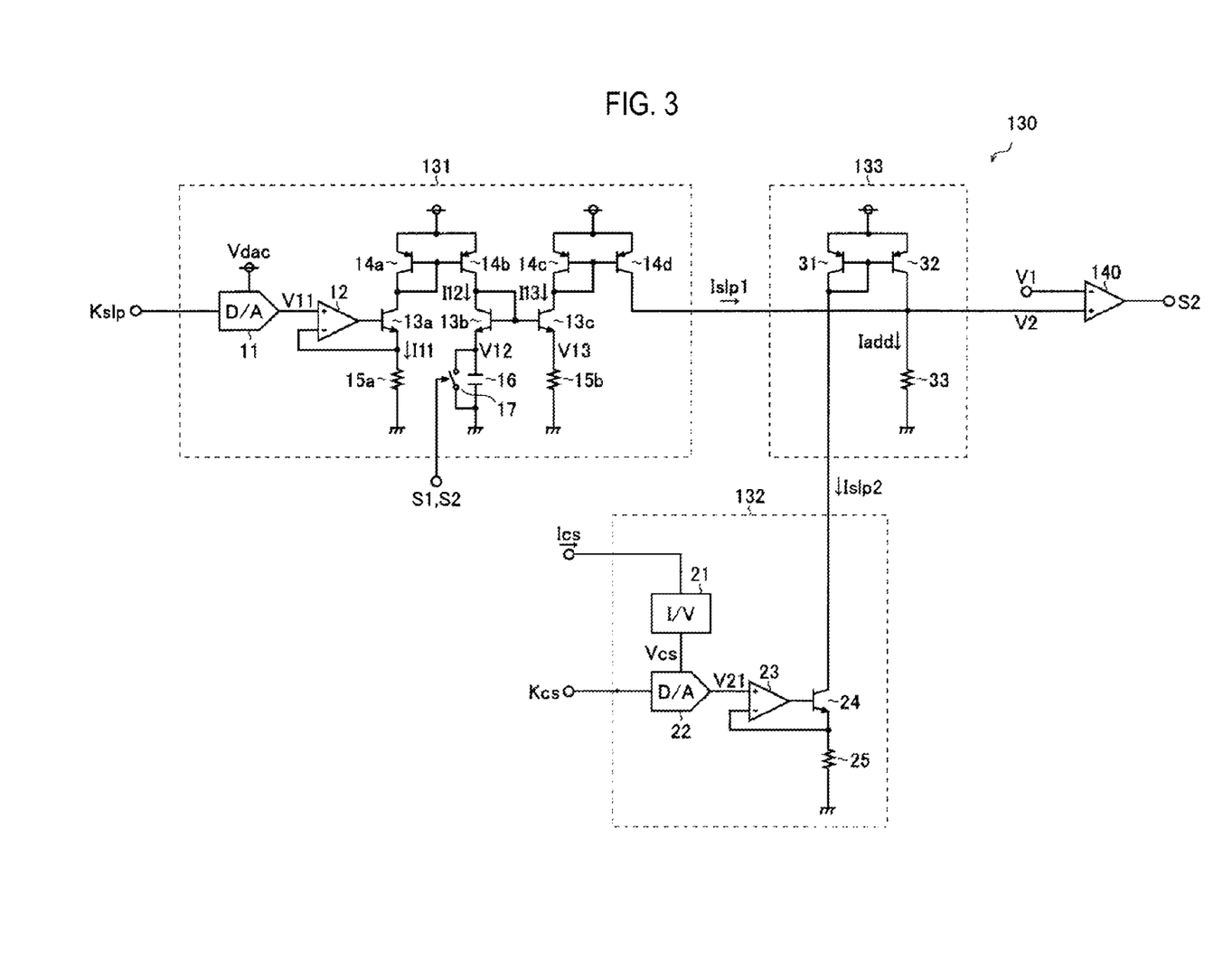
FIG. 3 is a block diagram showing one configuration example of a second voltage generation circuit 130.

FIG. 3 is a block diagram showing one configuration example of the second voltage generation circuit 130 (the slope oscillating part 131, the current detecting part 132 and the adding part 133).

The slope oscillating part 131 includes a D/A converter 11, an operational (OP) amplifier 12, npn type bipolar transistors 13a to 13c, pnp type bipolar transistors 14a to 14d, a resistor 15a (having resistance of R15a), a resistor 15b (having resistance of R15b), a capacitor 16 (having capacitance of C16) and a switch 17.

The D/A converter 11 generates a first analog voltage V11 (=Vdac×Kslp, where Vdac denotes a fixed voltage used as a power supply voltage and 0≤Kslp≤1) based on the first digital set value Kslp). The first analog voltage V11 is increased accordingly with the increase in the first digital set value Kslp and is decreased accordingly with the decrease in the first digital set value Kslp. The digital/analog conversion method may employ conventional methods (such as an R/2R method, a string method and the like) which are known in the art.

A non-inverted input terminal (+) of the OP amplifier 12 is connected to an application terminal of the first analog voltage V11. An inverted input terminal (−) of the OP amplifier 12 is connected to an emitter of the transistor 13a.

An output of the OP amplifier 12 is connected to a base of the transistor 13a. The emitter of the transistor 13a is connected to a first end of the resistor 15a. A second end of the resistor 15a is connected to a ground terminal. A collector of the transistor 13a is connected to a collector of the transistor 14a. Emitters of the transistors 14a and 14b are both connected to a power supply terminal Bases of the transistors 14a and 14b are both connected to the collector of the transistor 14a.

A collector of the transistor 14b is connected to a collector of the transistor 13b. An emitter of the transistor 13b is connected to a first end of the capacitor 16 and a first end of the switch 17. A second end of the capacitor 16 and a second end of the switch 17 are both connected to the ground terminal Bases of the transistors 13b and 13c are both connected to the collector of the transistor 13b. An emitter of the transistor 13c is connected to a first end of the resistor 15b. A second end of the resistor 15b is connected to the ground terminal. A collector of the transistor 13c is connected to a collector of the transistor 14c. Emitters of the transistors 14c and 14d are both connected to the power supply terminal Bases of the transistors 14c and 114d are both connected to the collector of the transistor 14c. A collector of the transistor 14d corresponds to an output terminal of the first slope current Islp1.

In the slope oscillating part 131 of this configuration example, the OP amplifier 12 controls a base voltage of the transistor 13a such that the non-inverted input terminal (+) and the inverted input terminal (−) are imaginary short-circuited. As a result, the first analog voltage V11 is applied to the first end of the resistor 15a and a current I11 (=V11/R15a) according to the first analog voltage V11 is flown through the resistor 15a. The transistors 14a and 14b form a first current mirror (having a mirror ratio of a). Therefore, a charging current I12 (=α×I11) according to the current I11 is flown through the collector of the transistor 14b.

Thus, the OP amplifier 12, the transistor 13a, the transistors 14a and 14b and the resistor 15a function as a first V/I converter for generating the charging current I12 according to the first analog voltage V11.

The capacitor 16 generates a charging voltage V12 by being charged with the charging current I12. The switch 17 performs charging/discharging control of the capacitor 16 in synchronization with the clock signal S1 and the comparison S2. For example, the switch 17 is switched off at the rising edge of the clock signal S1 and is switched on at the rising edge of the comparison signal S2. When the switch 17 is switched off, since the capacitor 16 is charged with the charging current I12, the charging voltage V12 of the capacitor 16 rises. On the other hand, when the switch 17 is switched on, since both ends of the capacitor 16 are short-circuited, the charging voltage V12 is rapidly discharged.

The transistors 13b and 13c form a second current mirror. A lower base-emitter voltage of the transistor 13b with increase in the charging voltage V12 provides a lower level of conduction of the transistor 13b. As a result, since a current flowing from the base to emitter of the transistor 13c is increased, a voltage across the resistor 15b is increased and a current I13 (=V13/R15b) flowing through the resistor 15b is increased. In addition, the transistors 14c and 14d form a third current mirror (having a mirror ratio of β). Therefore, the first slope current Islp1 (=β×I13) according to the current I13 is flown through the collector of the transistor 14d.

Thus, the transistors 13b and 13c, the transistors 14c and 14d and the resistor 15b function as a first V/I converter for generating the first slope current Islp1 according to the charging voltage V12 of the capacitor 16. In addition, since a slope (=I12/C16) of the charging voltage V12 is increased accordingly with the increase in the charging current I12, a slope of the first slope current Islp1 (further the first slope voltage Vslp1) is increased.

The current detecting part 132 includes an I/V converter 21, a D/A converter 22, an OP amplifier 23, an npn type bipolar transistor 24 and a resistor 25 (having a resistance of R25).

The I/V converter 21 generates a variable voltage Vcs according to the output current Ics. The variable voltage Vcs is increased accordingly with the increase in the output current Ics and is decreased accordingly with the decrease in the output current Ics.

The D/A converter 22 generates a second analog voltage V21 (=Vcs×Kcs, where Vcs denotes a variable voltage used as a power supply voltage and 0≤Kcs≤1) based on the second digital set value Kcs). The second analog voltage V21 is increased accordingly with the increase in the second digital set value Kcs and is decreased accordingly with the decrease in the second digital set value Kcs. The digital/analog conversion method may employ conventional methods (such as an R/2R method, a string method and the like) which are known in the art.

In addition, the D/A converter 22 is supplied with the variable voltage Vcs as its power supply voltage. Therefore, if data values of the second digital set value Kcs are the same, the second analog voltage V21 is increased accordingly with the increase in the second analog voltage V21, whereas the second analog voltage V21 is decreased accordingly with the decrease in the second analog voltage V21.

A non-inverted input terminal (+) of the OP amplifier 23 is connected to an application terminal of the second analog voltage V21. An inverted input terminal (−) of the OP amplifier 23 is connected to an emitter of the transistor 24. An output terminal of the OP amplifier 23 is connected to a base of the transistor 24. The emitter of the transistor 24 is connected to a first end of the resistor 25. A second end of the resistor 25 is connected to the ground terminal. A collector of the transistor 24 corresponds to an output terminal of the second slope current Islp2.

In the current detecting part 132 of this exemplary configuration, the OP amplifier 23 controls a base voltage of the transistor 24 such that the non-inverted input terminal (+) and the inverted input terminal (−) are imaginary short-circuited. As a result, the second analog voltage V21 is applied to the first end of the resistor 25 and the second slope current Islp2 (=V21/R25) according to the second analog voltage V21 is flown through the resistor 25.

Thus, the OP amplifier 23, the transistor 24 and the transistor 25 function as a third V/I converter for generating the second slope current Islp2 according to the second analog voltage V21.

The adding part 133 includes pnp bipolar transistors 31 and 32 and a resistor 33 (having resistance of Rslp). A collector of the transistor 31 is connected to a collector of the transistor 24 (the output terminal of the second slope current Islp2). Emitters of the transistors 31 and 32 are both connected to the power supply terminal Bases of the transistors 31 and 32 are both connected to the collector of the transistor 31. A collector of the transistor 32 is connected to the collector of the transistor 14d (the output terminal of the first slope current Islp1) and a first end of the resistor 33. A second end of the resistor 33 is connected to the ground terminal and the first end of the resistor 33 corresponds to the output terminal of the second voltage V2.

The transistors 31 and 32 form a current mirror which mirrors and returns the second slope current Islp2 and functions as a current adding part for generating an additional current Iadd (=Islp1+Islp2) which is obtained by adding the first slope current Islp1 and the second slope current Islp2.

The resistor 33 functions as a second IN converting part for generating the second voltage V2 (=Iadd×Rslp) according to the additional current Idd flown into the resistor 33.

The npn bipolar transistors 13a, 13b 13c, 24 in this figure may be replaced with N-channel type MOS (Metal Oxide Semiconductor) field effect transistors. Similarly, the pnp bipolar transistors 14a, 14b, 14c, 14d, 31 and 32 in this figure may be replaced with P-channel type MOS field effect transistors.

Figure 4:
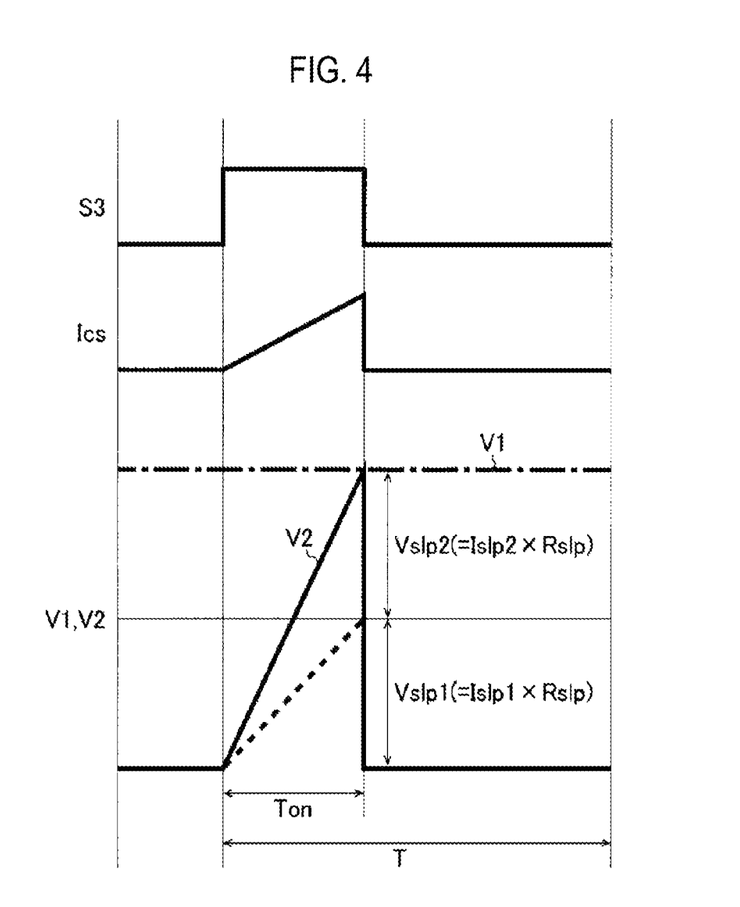
FIG. 4 is a waveform diagram showing one example of slope variable control.

FIG. 4 is a waveform diagram showing one example of the slope variable control, depicting the PWM signal S3, the output current Ics (here assumed as the switching current flown through the output transistor), the first voltage V1 and the second voltage V2 in this order from above.

As shown in this figure, the second voltage V2 is generated by adding the first slope voltage Vslp1 (=Islp1×Rslp) and the second slope voltage Vslp2 (=Islp2×Rslp). Here, as described earlier, the slope of the first slope voltage Vslp1 can be randomly adjusted by using the first digital set value Kslp and the slope of the second slope voltage Vslp2 (the current feedback gain by which the output current Ics is multiplied) can be randomly adjusted by using the second digital set value Kcs.

This configuration makes it possible to freely set the slope of the first slope voltage Vslp1 and the slope of the second slope voltage Vslp2 (further the slope of the second voltage V2) depending on the usage situations of the switching power supply 100 and optimize the responsiveness and stability of the switching power supply 100.

Figure 5A:
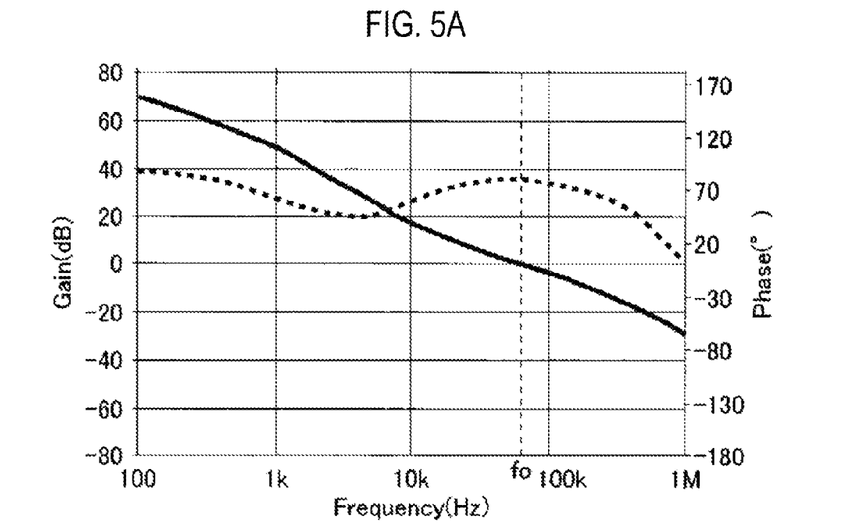
FIGS. 5A to 5C are Bode plots showing one example of adjustment of a second digital set value Kcs.
Figure 5B:
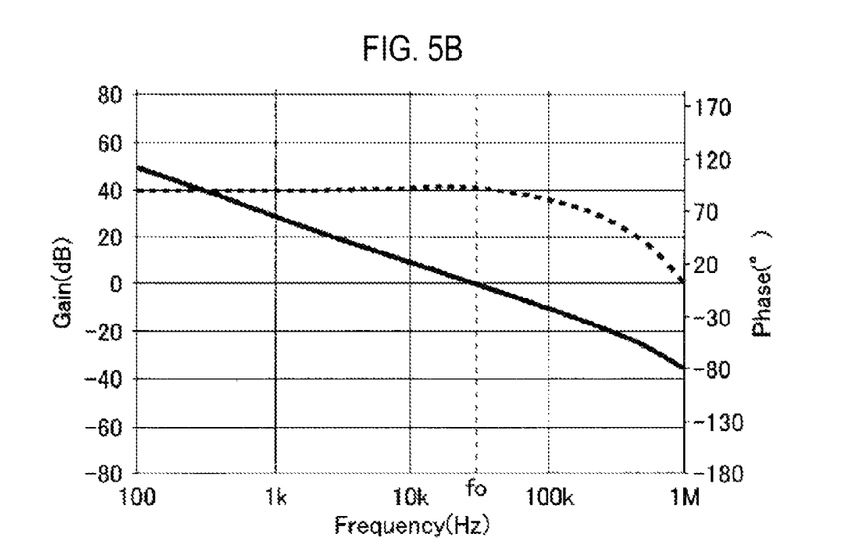
Figure 5C:
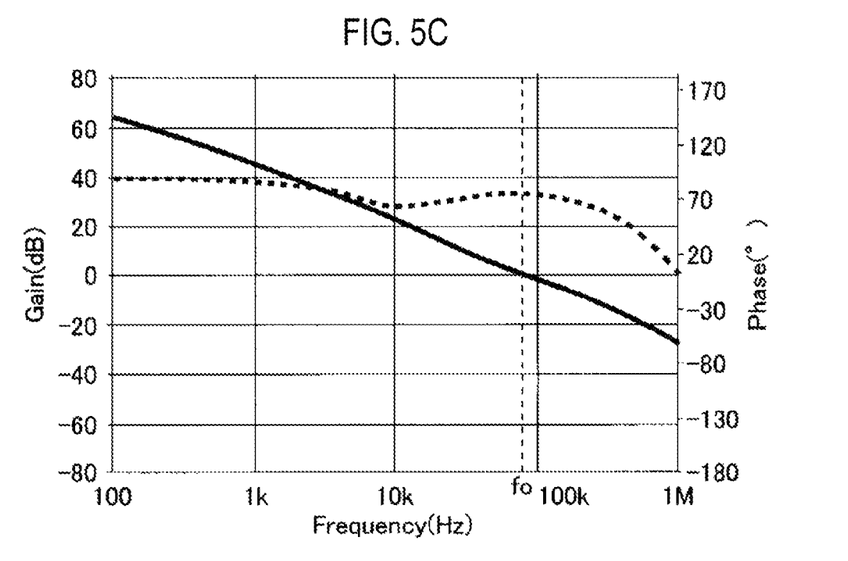

FIGS. 5A to 5C are Bode plots showing one example of an adjustment of the second digital set value Kcs, where sections (a) to (c) depict frequency characteristics of gain (indicated by a solid line) and phase (indicated by a dashed line). In each Bode plot, a horizontal axis (logarithmic axis) represents a frequency (Hz), a left vertical axis represents a gain (dB) and a right vertical axis represents a phase)(°.

Section (a) in this figure shows a frequency characteristic when the second digital set value Kcs is set such that a crossover frequency fo (a frequency at which a gain is 0 dB) is 60 kHz for any magnitude of the load current Io.

Here, when the load current To is increased ten times without changing the second digital set value Kcs, the crossover frequency fo is decreased from 60 kHz to 30 kHz, as shown in section (b) in this figure. In other words, the responsiveness of the switching power supply 100 may deteriorate with an increase in the load current Io.

On the other hand, when the second digital set value Kcs is set to 1/7 times, the crossover frequency fo is increased from 30 kHz to 80 kHz, as shown in section (c) in this figure. That is, the crossover frequency fo can be increased accordingly by setting the second digital set value Kcs to a lower value.

Thus, by setting the second digital set value Kcs to be small when the load current To is large, it is possible to improve the responsiveness of the switching power supply 100.

Figure 6A:
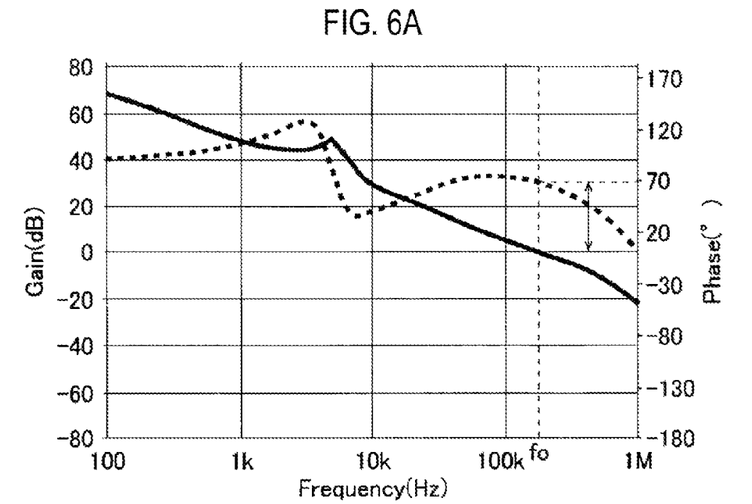
FIGS. 6A to 6C are Bode plots showing one example of adjustment of a first digital set value Kslp.
Figure 6B:
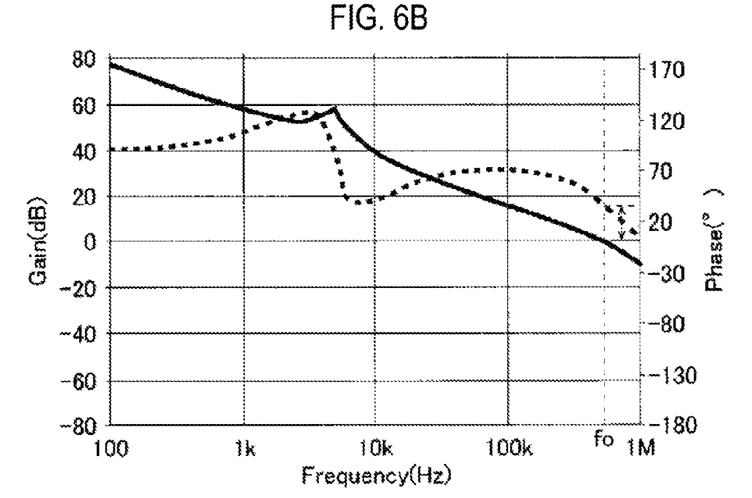
Figure 6C:
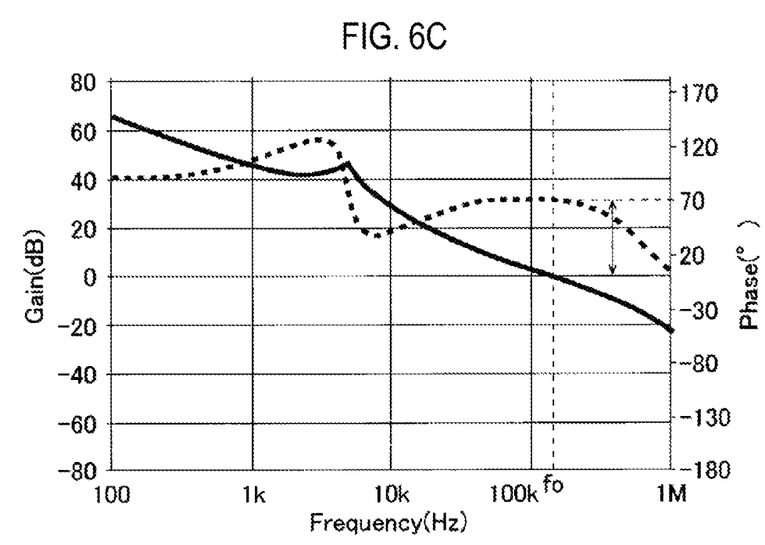

FIGS. 6A to 6C are Bode plots showing one example of adjustment of the first digital set value Kslp, where sections (a) to (c) depict frequency characteristics of gain (indicated by a solid line) and phase (indicated by a dashed line), similarly to FIGS. 5A to 5C. In each Bode plot, a horizontal axis (logarithmic axis) represents a frequency (Hz), a left vertical axis represents a gain (dB) and a right vertical axis represents a phase)(°.

The section (a) in this figure shows a frequency characteristic when the first digital set value Kslp is set such that a phase margin (i.e., a phase at the crossover frequency fo) is 60° or more for any value of the input voltage Vi.

Here, when the input voltage Vi is increased three times without changing the first digital set value Kslp, the phase margin is decreased from 60° or more to about 35°, as shown in section (b) in this figure. In other words, the responsiveness of the switching power supply 100 may deteriorate with the increase in the input voltage Vi.

On the other hand, when the first digital set value Kslp is set to 1/4 times, the phase margin is increased from about 35° to 60° or more, as shown in the section (c) in this figure. That is, the phase margin can increase while the first digital set value Kslp is set to a lower value.

Thus, by setting the first digital set value Kslp to be small when the input voltage Vi is large, it is possible to improve the stability of the switching power supply 100.

In the above, the specific adjusting methods have been described with attention paid to the correlation between the load current To and the second digital set value Kcs and the correlation between the input voltage Vi and the first digital set value Kslp. It should be, however, noted that, even in a case where other parameters (such as an output voltage, a switching frequency, temperature and the like) relating to the usage situations of the switching power supply 100, the first digital set value Kslp and the second digital set value Kcs may be adjusted to optimize the responsiveness and stability of the switching power supply 100 in the same manner as above.

Second Embodiment

Figure 7:
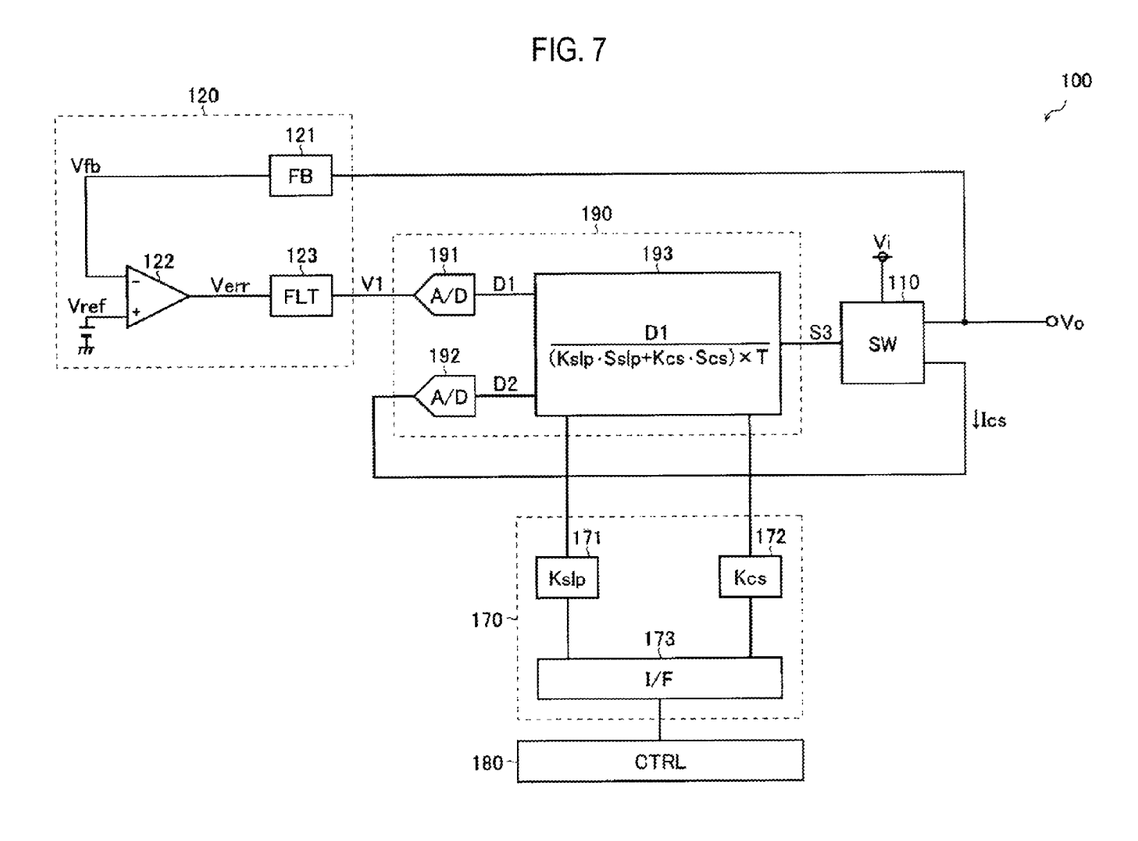
FIG. 7 is a block diagram showing a switching power supply 100 according to a second embodiment.

FIG. 7 is a block diagram showing a switching power supply 100 according to a second embodiment. This embodiment is based on the previous first embodiment and is characterized in that the switching power supply 100 includes a digital signal processing circuit 190 in place of the second voltage generating circuit 130, the comparing circuit 140, the clock oscillating circuit 150 and the logic circuit 160. In the second embodiment, the same elements as in the first embodiment are denoted by the same reference numerals as in FIG. 1 and explanation of which will not be repeated. The following description is focused on characteristic portions of the second embodiment.

The digital signal processing circuit 190 is a processor (a so-called DSP (Digital Signal Processor) which receives the first voltage V1, the output current Ics, the first digital set value Kslp (corresponding to a voltage slope coefficient) and the second digital set value Kcs (corresponding to a current slope coefficient) and generates the PWM signal S3, and includes, as its functional blocks, A/D converting parts 191 and 192 and a PWM duty cycle calculating part 193.

The A/D converting part 191 converts the first voltage V1 into a digital value D1.

The A/D converting part 192 converts the output current Ics into a digital value D2.

The PWM duty cycle calculating part 193 calculates a duty cycle DUTY of the PWM signal S3 based on the digital values D1 and D2, the first digital set value Kslp and the second digital set value Kcs.

In more detail, the PWM duty cycle calculating part 193 sets a duty cycle DUTY of the PWM signal S3 based on a formula of DUTY=D1/{(Kslp×Sslp+Kcs×Scs)×T}, In the formula, D1 denotes a digital value of the first voltage V1, Sslp denotes a predetermined voltage slope (constant), Scs denotes a current slope varied depending on the output current Ics flown through the switching output circuit 110, which is a variable value depending on the digital value D2, Kslp denotes a data value (voltage slope coefficient) of the first digital set value Kslp, Kcs denotes a data value (current slope coefficient) of the second digital set value Kcs, and T denotes a switching period.

Thus, when the output feedback control is performed by the above-described digital processing, it is less susceptible to effects by switching noises or the like, which can result in the improvement of the precision of the output voltage Vo.

In addition, like the first embodiment, the first digital set value Kslp and the second digital set value Kcs can be randomly adjusted depending on the usage situations (such as an input voltage, an output voltage, a switching frequency, temperature and the like) of the switching power supply 100. Therefore, it is possible to optimize the responsiveness and stability of the switching power supply 100 depending on the usage situations of the switching power supply 100.

Third Embodiment

Figure 8:
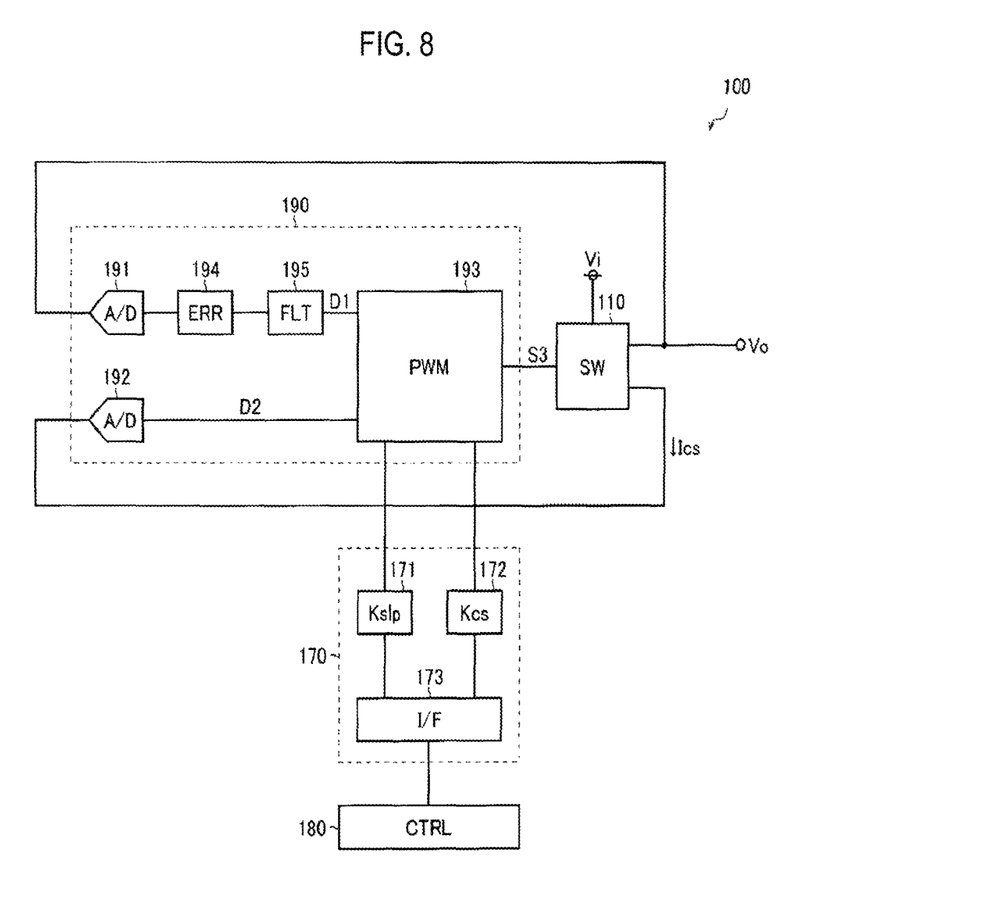
FIG. 8 is a block diagram showing a switching power supply 100 according to a third embodiment.

FIG. 8 is a block diagram showing a switching power supply 100 according to a third embodiment. This embodiment is based on the previous second embodiment and is characterized in that the first voltage generating circuit 120 is contained in the digital signal processing circuit 190.

In more detail, the digital signal processing circuit 190 includes, as its functional blocks, an error amplifier 194 and a phase compensation filter 195 in a later stage of the A/D converter 191. The error amplifier 194 and the phase compensation filter 195 are obtained by implementing the error amplifier 122 and the phase compensation filter 123, respectively, by digital processing. In this exemplary figure, the output voltage Vo is assumed to fall within an input dynamic range of the A/D converter 191 and the feedback voltage generating part 121 is omitted.

Thus, when the output feedback control is entirely digitized, it is less susceptible to effects by switching noises or the like than the previous second embodiment, which can result in further improvement of the precision of the output voltage Vo.

Other Embodiments

While certain embodiments have been described, these embodiments have been presented by way of example only, and are not intended to limit the scope of the present disclosures. Indeed, the novel methods and apparatuses described herein may be embodied in a variety of other forms; furthermore, various omissions, substitutions and changes in the form of the embodiments described herein may be made without departing from the spirit of the present disclosures. The accompanying claims and their equivalents are intended to cover such forms or modifications as would fall within the scope and spirit of the present disclosures.

According to the embodiments of the present disclosure, it is possible to provide a switching power supply capable of optimizing its responsiveness and stability.

INDUSTRIAL APPLICABILITY

The present disclosure can be applied to the general switching power supplies (particularly, power supplies for vehicle or industrial equipment requiring large power).

What is claimed is:

1. A switching power supply comprising:
    a switching output circuit configured to generate an output voltage from an input voltage according to ON/OFF control of an output transistor by a pulse width modulation signal;
    a first voltage generating circuit configured to generate a first voltage based on a difference between the output voltage or a corresponding feedback voltage and a predetermined reference voltage;
    a second voltage generating circuit configured to generate a triangular or sawtooth-waved second voltage;
    a comparing circuit configured to generate a comparison signal by comparing the first voltage and the second voltage;
    a clock oscillating circuit configured to generate a clock signal having a switching frequency; and
    a logic circuit configured to generate the pulse width modulation signal in response to the clock signal and the comparison signal,
    wherein the second voltage generating circuit generates the second voltage by adding a first slope voltage having a first slope and a second slope voltage having a second slope according to an output current flown through the switching output circuit, and at least one of the first slope and the second slope is randomly adjusted depending on a set value, and
    wherein the second voltage generating circuit includes:
    a slope oscillating part which generates the first slope voltage;
    a current detecting part which generates the second slope voltage; and
    an adding part which generates the second voltage by adding the first slope voltage and the second slope voltage.

2. The switching power supply of claim 1, further comprising a frequency characteristic adjusting circuit configured to provide the set value to the second voltage generating circuit.

3. The switching power supply of claim 2, wherein the frequency characteristic adjusting circuit includes:
    a register part which stores the set value; and
    an interface part which rewrites the set value according to an instruction from a control circuit.

4. The switching power supply of claim 1, wherein the slope oscillating part includes:
    a first D/A converter which generates a first analog voltage according to a first digital set value, with a fixed voltage as a power supply voltage;
    a first V/I converter which generates a charging current according to the first analog voltage;
    a capacitor charged with the charging current;
    a switch which performs charging/discharging control of the capacitor in synchronization with the clock signal; and
    a second V/I converter which generates a first slope current according to a charging voltage of the capacitor.

5. The switching power supply of claim 4, wherein the current detecting part includes:
    a first I/V converter which generates a variable voltage according to the output current;
    a second D/A converter which generates a second analog voltage according to a second digital set value, with the variable voltage as a power supply voltage; and
    a third V/I converter which generates a second slope current according to the second analog voltage.

6. The switching power supply of claim 5, wherein the adding part includes:
a current adder which generates an additional current by adding the first slope current and the second slope current; and
a second I/V converter which generates the second voltage according to the additional current.

7. The switching power supply of claim 1, wherein the first voltage generating circuit includes:
an error amplifier which generates an error voltage based on a difference between the output voltage or the feedback voltage and the reference voltage; and
a phase compensation filter which generates the first voltage by compensating a phase of the error voltage.

8. A switching power supply comprising:
a switching output circuit configured to generate an output voltage from an input voltage according to ON/OFF control of an output transistor by a pulse width modulation signal;
a first voltage generating circuit configured to generate a first voltage based on a difference between the output voltage or a corresponding feedback voltage and a predetermined reference voltage; and
a digital signal processing circuit configured to generate the pulse width modulation signal,
wherein the digital signal processing circuit sets a duty cycle (DUTY) of the pulse width modulation signal based on the following formula:

$$DUTY = D1/\{(Kslp \times Sslp + Kcs \times Scs) \times T\},$$

where, D1 denotes a digital value of the first voltage, Sslp denotes a predetermined voltage slope, Scs denotes a current slope varied depending on the output current flown through the switching output circuit, Kslp denotes a voltage slope coefficient, Kcs denotes a current slope coefficient, and T denotes a switching period, and
wherein at least one of the voltage slope coefficient and the current slope coefficient is randomly adjusted.

9. The switching power supply of claim 8, wherein the first voltage generating circuit is implemented by digital processing in the digital signal processing circuit.

10. A switching power supply comprising:
a switching output circuit configured to generate an output voltage from an input voltage according to ON/OFF control of an output transistor by a pulse width modulation signal;
a first voltage generating circuit configured to generate a first voltage based on a difference between the output voltage or a corresponding feedback voltage and a predetermined reference voltage;
a second voltage generating circuit configured to generate a triangular or sawtooth-waved second voltage;
a comparing circuit configured to generate a comparison signal by comparing the first voltage and the second voltage;
a clock oscillating circuit configured to generate a clock signal having a switching frequency; and
a logic circuit configured to generate the pulse width modulation signal in response to the clock signal and the comparison signal,
wherein the second voltage generating circuit generates the second voltage by adding a first slope voltage having a first slope and a second slope voltage having a second slope according to an output current flown through the switching output circuit, and at least one of the first slope or the second slope is set by a set value that is adjusted by a control circuit.

11. The switching power supply of claim 10, further comprising a register which stores the set value that is adjusted by the control circuit.

* * * * *